Patented Oct. 13, 1936

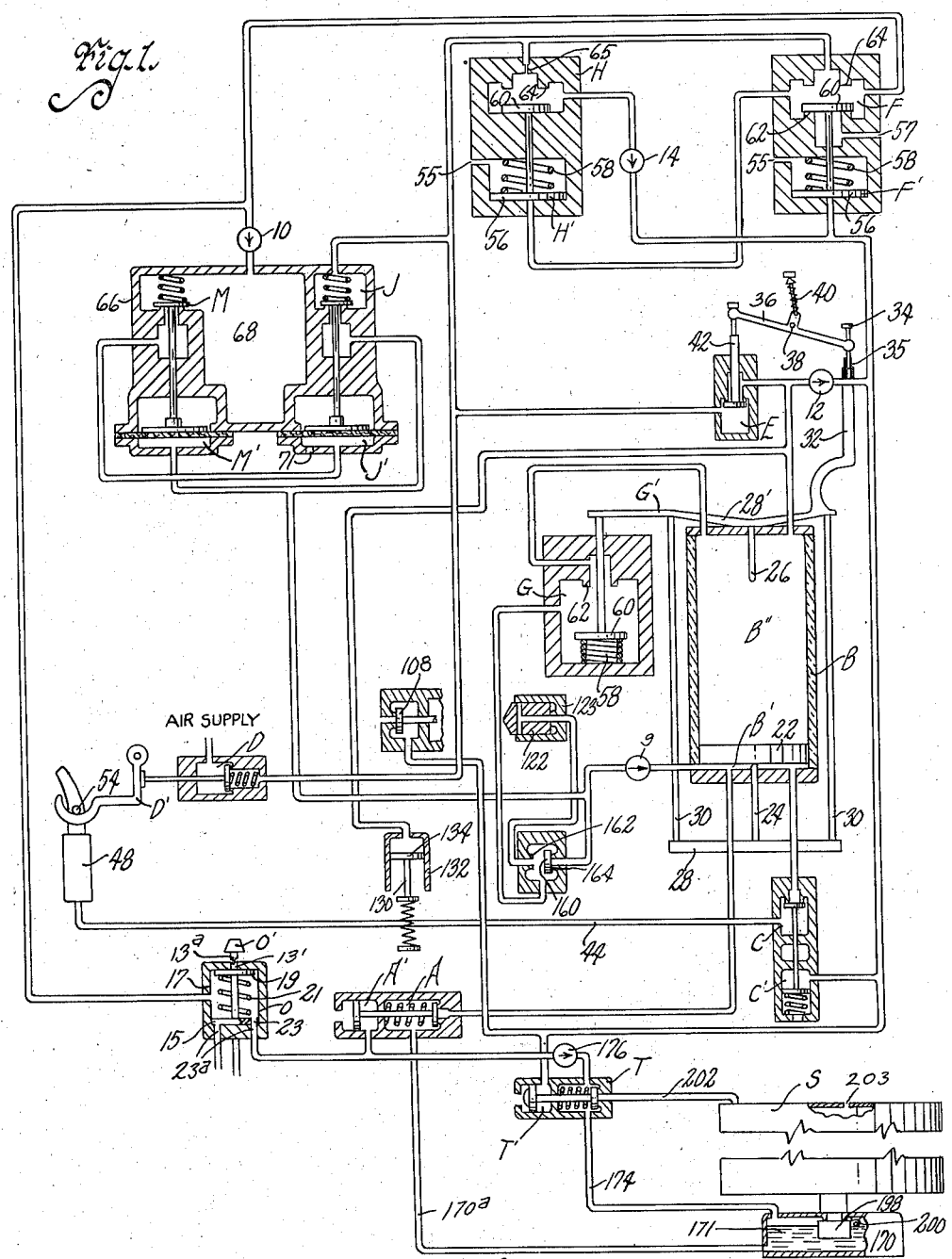

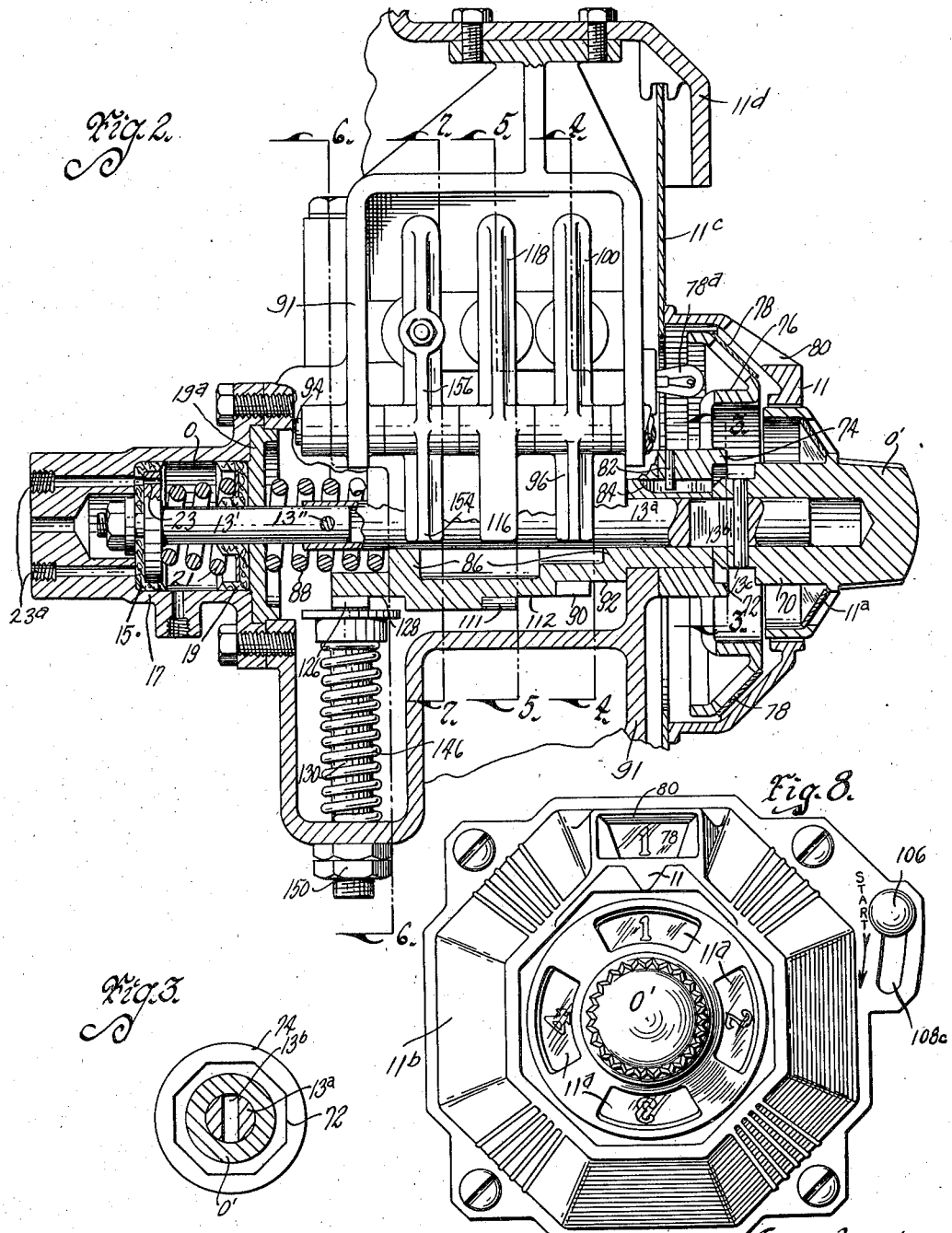

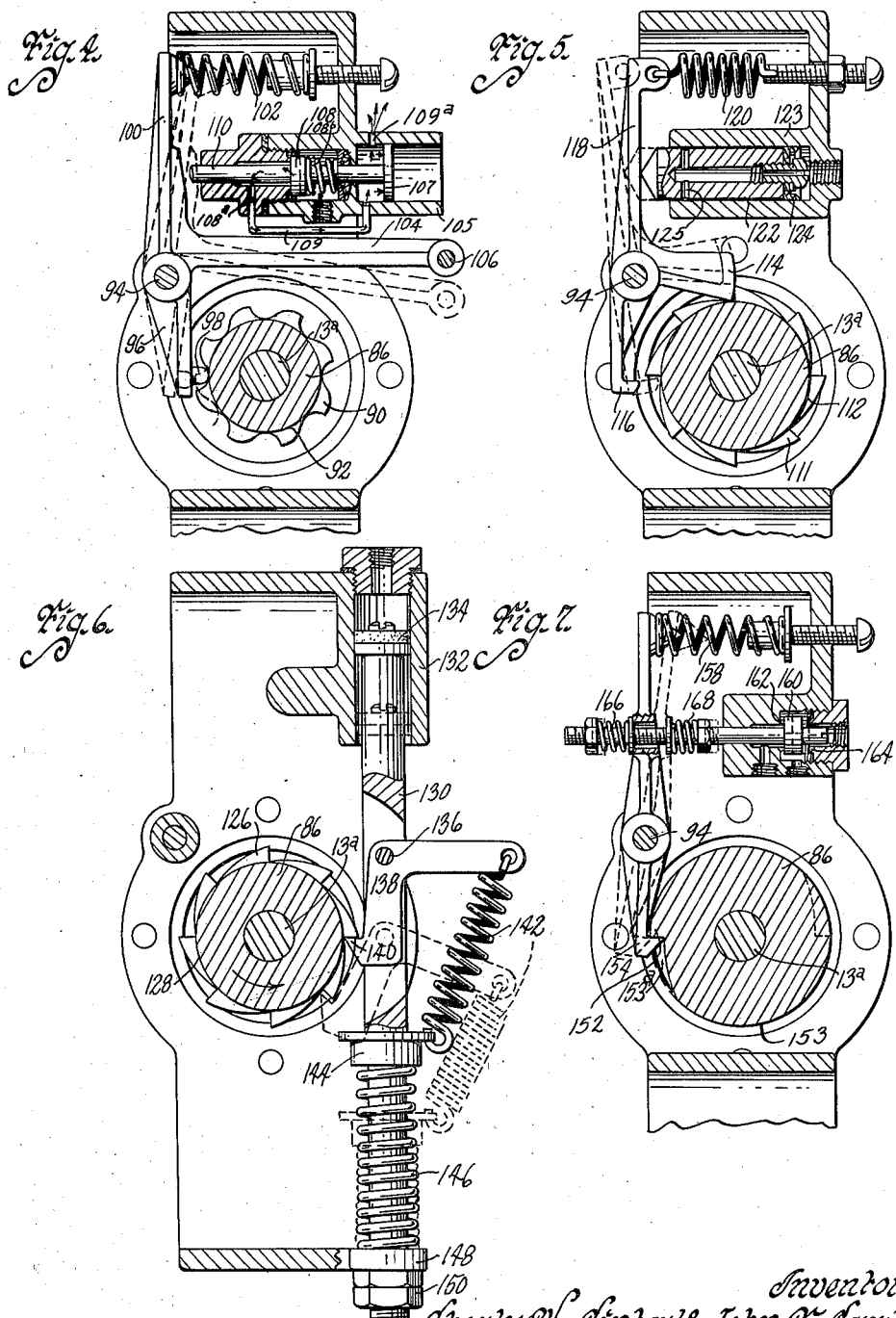

2,057,483

UNITED STATES PATENT OFFICE 2,057,483

SELECTIVE OIL DISPENSER

Charles W. Ginter and John F. Carter, Bryan, Ohio, assignors to The Aro Equipment Corporation, Bryan, Ohio, a corporation of Ohio Application July 26, 1934, Serial No. 737,062

18 Claims. (Cl. 221—101)

An object of our present invention is to provide simple, durable and inexpensive mechanism for operation in connection with the oil dispensing system shown in our copending application filed February 19, 1934, Serial No. 711,952, the mechanism being for the purpose of selecting the number of quantities of oil being dispensed by such system and causing blowing out of the film of oil from the apparatus after such number only instead of after each quantity is dispensed as in the copending application.

A further object is to provide mechanism for use with an oil dispenser of the kind which in operation blows out the dispensing hose, the mechanism being settable so that the blowing out operation occurs only after a predetermined number of quantities of oil has been dispensed, the mechanism also including a means to exhaust air to atmosphere, which air if it were not for the mechanism, would cause the blowing out operation.

More particularly, it is our object to provide a ratchet drum arrangement which can be set for the predetermined number of quantities of oil to be dispensed before the blow out operation occurs, an actuator being associated with the ratchet drum for rotating it step by step as quantities of oil are dispensed so that when it is finally rotated to a predetermined position, the blow out operation will occur.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:

Figure 1 is a diagrammatic view of an oil dispensing system such as disclosed in our copending application, showing elements of our improvement included therewith.

Figure 2 is a side elevation, partly in section, of our improved device for selecting the number of quantities of oil to be dispensed before the blow out operation occurs.

Figure 3 is a sectional view on the line 3—3 of Figure 2 showing a control knob connection.

Figures 4, 5, 6, and 7 are vertical sectional views on the lines 4—4, 5—5, 6—6, and 7—7, respectively, of Figure 2; and Figure 8 is a front elevation of the control knob and dials associated with it as viewed from the right end of Figure 2.

We will first describe the entire oil dispensing system, including the elements shown in our copending application, and then describe our improvement as it is connected with the system.

The oil dispensing system includes an oil supply valve A which is normally spring seated but can be unseated by a piston within a cylinder when air is admitted thereto from a selector valve O. The piston and cylinder constitute an actuator A' for the valve A. The selector valve O has an actuator O' which is merely a manual control knob having a dial with characters 11a thereon, either of which is adapted to register with a pointer 11 on an ornamental face plate 11b which would be conveniently mounted on a front panel 11c of the oil dispenser casing, a portion of which is indicated at 11d in Figure 2, but which is not further illustrated in this application as it forms no part of the present invention.

The numbers 1, 2, 3, and 4 indicated at 11a are to indicate the oil selected from various storage tanks such as disclosed in our copending application.

The control knob O' is slidably but non-rotatably secured to a shaft 13a by means of a pin and slot connection indicated at 13c and 13b (see Figure 2). The shaft 13a has an extension 13', the two being secured together as by a pin 13''. The shaft 13' has secured to it a cup leather 15 located within a cylinder 17. A cup leather 19 serves as a seal against leakage between a head 19a of the cylinder and the shaft 13'. A spring 21 is interposed between the cup leathers to retain them expanded and, in addition, the presence of compressed air within the cylinder 17 keeps them expanded.

The oil selector thus far described is equivalent to the one shown in our copending application and it is here illustrated in detail merely because it is associated with the rest of the mechanism of this application so that the knob O' can operate both the mechanism and the oil selector valve.

In the operation of the selector valve O, it may be rotated while there is no air in the cylinder 17 so that a port 23 therein may register with any one of four ports 23a leading to any one of four different oil supply valve actuators such as A', only one of which is illustrated in the present application.

The particular oil supply valve actuator subsequently charged with compressed air admitted to the cylinder 17 then opens the proper valve such as A corresponding to the storage tank from which the selection of oil has been made.

While the compressed air is present in the cylinder 17, it creates enough friction between the cup leathers 15 and 19 and their confining parts of the cylinder 17 as to make it very difficult, if not impossible, to rotate the knob O' by hand, thus insuring that the selector valve will not be erroneously changed during a dispensing operation and mix the different oils capable of dispensation.

The dispensing system further includes an oil measuring and dispensing receptacle or cylinder B having an oil compartment B' below a piston 22 and a compressed air compartment B" above the piston. The piston 22 is adapted to reciprocate in the cylinder B and when it reaches its lower limit, it engages a rod 24, while at its upper limit it engages a rod 26. The rods 24 and 26 are carried by cross arms 28 28' which are connected together by rods 30. The assembly of the elements 24 to 30 inclusive reciprocates a boss 32 in which is adjustably mounted a stop rod 34.

A stop sleeve 35 is also adjustably mounted in the boss 32. The stop rod and the stop sleeve are adjustable so as to co-relate the action of a master valve E and a blow out and exhaust valve G, as well as accurately predetermine the quantity of oil dispensed by the mechanism.

Receiving oil from the chamber B' of the cylinder B is a normally closed outlet valve C having an actuating mechanism C'. A normally closed cut-off valve D is interposed between the supply of compressed air and the master valve E as well as all other parts of the dispensing apparatus. The actuating mechanism for the cut-off valve D comprises a supporting arm D' which is normally lowered by the weight of a dispensing nozzle valve 48 thereon for closing the cut-off valve D.

The master valve E is associated with the cut-off valve D for controlling air therefrom to the dispensing cylinder B as well as to other parts of the apparatus. The actuating mechanism E' for the valve E consists of a toggle lever 36 pivoted at 38 and actuated by the head of the stop rod 34 and the upper end of the stop sleeve 35. The toggle action is produced by an over-center spring 40. The toggle lever 36 engages a valve plunger 42 of the master valve E to move it to its closed or open positions in accordance with the movement of the boss 32 produced by the reciprocating piston 22 in the cylinder B.

A selector and charging control valve F of four way type is provided for controlling the actuating mechanism A' through the selector valve O and for controlling an actuator H'. The valve F has an actuator F', while the actuator H' has a charging valve H associated therewith.

The actuators F' and H' comprise pistons 56 within cylinders to which compressed air can be admitted for moving the pistons against the action of springs 58. This, in the case of the valve F, unseats a valve plug 60 from a normally closed seat 62 and seats it against a normally open seat 64, while in the case of the charging valve H, it merely seats the valve plug against a normally open seat 64. The valve H has a restricted entrance 65 at its top for compressed air. The valve F includes a vent 57 to atmosphere and through which air may escape from the valve F when the actuator F' is in its non-normal position.

Vents 55 are provided in the actuators F' and H' to prevent undesired back pressure.

A valve G is provided having an actuator which consists merely of an extension G' from the arm 28', the valve G being a normally seated valve plug 60 against a seat 62 caused by the action of the spring 58.

The dispensing nozzle 48 is provided with pins 54 or the like to engage the supporting hook D' which is preferably of forked construction.

The oil to be dispensed is conducted from the oil valve C through a hose or the like 44 to the nozzle 48. The hose 44 is preferably flexible so as to permit carrying of the dispensing nozzle to the proper position on a part of an automobile or the like into which the oil is to be dispensed. Check valves 9, 10, 12, and 14 are mounted in the pipe lines as shown in Figure 1 and the purpose of these will be hereinafter set forth.

The dispensing system includes a unit 66 having therein a blow out valve J actuated by a diaphragm type of actuator J' and a transfer valve M actuated by a diaphragm type of actuator M'. Within the unit 66 there is provided an air chamber 68 within which a charge of air may be trapped between the transfer valve M and the check valve 10.

At the lower right corner of Figure 1, a storage tank S is illustrated. It includes a sump 170 and a sump valve T having an actuator T'. These parts are shown diagrammatically in the present application but are shown in detail in our copending application Serial No. 735,569 filed July 23, 1934. The sump 170 is adapted to receive oil by gravity from the storage tank S, a combined float and check valve 198 pivoted at 200 being provided to at times close communication between the storage tank and the sump.

The sump 170 has an oil line 171 leading to the oil supply valve A and an air line 174 communicating with the sump valve T.

Air is adapted to be supplied from the selector valve O through a check valve 176 to the sump valve T. When the valve T is open, air from the air line 174 is adapted to discharge into the storage tank S, the tank being vented as at 203 so that such air will be discharged to atmosphere.

The mechanism constituting the specific improvement of the present application will now be described. Referring to Figure 2, the knob O' engages the right hand end of a ratchet drum 86 surrounding the shaft 13a. A spring 88 is interposed between the cylinder head 19a and the left end of the ratchet drum 86, thus normally constraining the drum toward movement in a right hand direction. The knob O', however, can be pushed inwardly to thus push the entire drum 86 inwardly against the action of the spring 88.

The ratchet drum 86 is provided with a series of cam teeth 90 adjacent which is a circular portion 92 (see Figure 4); a series of ratchet teeth 111 adjacent which is a circular portion 112 (see Figure 5); a series of ratchet teeth 126 adjacent which is a circular portion 128 (see Figure 6); and a single ratchet tooth 152 (see Figure 7).

A shaft 94 is supported by a casing 91 which surrounds the mechanism shown in Figure 2. A lever 96 is pivoted thereon and has a projection 98 normally registering with the cam teeth 90. The lever 96 has an extension 100 which is constrained to move in one direction by a spring 102 (see Figure 4). It also has an arm 104 to which a starting knob 106 is secured, the knob projecting through a slot 108c in the front of the dispenser and of the face plate 11b. The lever 100 is adapted to coact with a valve stem 110 of a bleeder valve 108 and move it from its normally closed position when the starting knob 106 is pushed downwardly or when one of the cam teeth 90 assumes such position that it will swing the projection 98 away from the shaft 13a.

We provide a means for delaying closure of the valve 108, after it has once been opened, consisting of a piston 107 in a cylinder 105 and a conduit 109 leading from the exhaust port 108a of the valve 108 and communicating with the cylinder 105 between the valve 108 and the piston 107. This means also includes a vent 109a.

Normally associated with the ratchet teeth 111 is an escapement lever having portions 114, 116, and 118 (see Figure 5). It is normally constrained toward the full line position by a spring 120 which can be moved to the dotted line position by a combined piston and exhaust valve 122. The piston has a cup leather 124 in a cylinder 123 and has exhaust passageways 125 adapted to exhaust air to atmosphere when the passageways assume a position beyond the left end of the cylinder 123. The piston 122 is a loose fit in the cylinder 123.

Associated with the ratchet teeth 126 is a ratchet drum actuator 130 comprising a rod slidably mounted in a cylinder 132 and a perforated ear 148 (see Figure 6). A cup leather 134 is provided for the rod to act as a piston for sliding the rod against the action of a spring 146 when air is admitted to the cylinder 132 above the cup leather. The actuating rod 130 has pivoted to a pin 136 thereof a bell crank lever 138 having an actuating pawl 140. A spring 142 tends to engage the pawl with the ratchet teeth 126, reverse rotation of the ratchet drum being prevented by the escapement lever 114. The spring 142 has one end secured to the bell crank lever 138 and the other end secured to a collar 144 secured to the actuating rod 130. A spring 146 is interposed between the collar 144 and the ear 148. A pair of lock nuts 150 is provided to limit upward sliding of the rod 130 as caused by the spring 146.

The single ratchet tooth 152 shown in Figure 7 has associated with it and pivoted on the shaft 94 a lever 154. It is constrained to move in a counterclockwise direction by a spring 158. Associated with the lever 154 is a control valve 160 normally seated by a spring 166 against a seat 162 and adapted to be seated against another seat 164 by a spring 168 when the lever 154 is in the dotted position.

The ratchet drum 86 has a face 153 which is circular except for a notch 153a therein and whenever the lower end of the lever 154 registers with the face 153, the lever will assume its dotted position, seating the valve 160 against the seat 164.

The bleeder valve 108 of Figure 4 is connected in Figure 1 with the master valve E to receive air through a bleeder line 46 whenever the valve is open and to bleed this line when the bleeder valve is open. The exhaust valve 122 is connected with the seat 162 of the control valve 160. The piston 134 of Figure 6 is connected with the compressed air line from the control valve F to the selector valve O, while the control valve 160 of Figure 7 has its seat 164 connected with the blow out valve J, transfer valve actuator M' and cylinder compartment B'.

The central port of the three way valve 160 is connected with the exhaust valve G so that the air supplied therefrom can normally pass the seat 164 or pass the seat 162 when the control valve 160 is in the dotted line position of Figure 7.

*Practical operation*

In order to operate the apparatus, the selector knob O' is first pushed inwardly so that an octagonal hub 70 thereof will engage in an octagonal socket 72 of a hub 74. The hub 74 carries an indicator dial 76 having indicating characters 78 thereon.

The characters 78 and also the characters 11a of the knob O' may be in the form of opaque numbers on a transparent element so that the numbers can be readily seen at night by energizing a small electric light 78a back of the face plate 11b (see Figure 2).

Upon the hub 70 engaging the socket 72, the knob O' can be rotated for selecting the number of quarts or other predetermined quantities of oil to be dispensed before the hose blow out operation occurs. A non-rotatable and slidable connection is provided between the dial 76 and the ratchet drum 86 by means of a pin and slot connection 82 and 84. The inward motion of the knob O' slides the ratchet drum inwardly for causing the projection 98 in Figure 4, the lever 14 in Figure 5 and the pawl 140 in Figure 6 to register with the handle portions 92, 112, and 128, respectively of the ratchet drum. The ratchet drum can now be rotated in a right hand direction without the cam teeth 90 engaging the projection 98 or the ratchet teeth 111 and 128 engaging the escapement lever 114 and the holding pawl 140.

The knob O' is rotated in a right hand direction until the proper character 78 appears corresponding to the number of quarts of oil to be dispensed before the blow out operation occurs. The mechanism has been designed for eight quarts, although it can be designed for any other number.

In the dotted position of Figure 7, the ratchet drum has been rotated a half revolution which would correspond to four quarts, thus placing the notch 153a, an equivalent of four cam and ratchet teeth, from the initial position and causing by the end of an eighth revolution, movement of the lever 154 to the dotted position for placing the valve 160 in operating position shown by dotted lines in Figure 7 and by full lines in Figure 1. The operator can now release the knob O' and it will be pushed outwardly by the spring 88.

The next step in the operation is to select which storage tank oil is to be taken from. This is done by leaving the knob O' in its outer position and rotating it until the proper character 11a corresponds to the pointer 11.

The apparatus is now set to dispense oil from the selected storage tank and to dispense the selected number of quarts of oil before the apparatus ceases to operate.

Assuming the various elements of the apparatus to be in the position shown in Figure 1, to dispense a predetermined quantity of oil as measured by the cylinder B and the piston 22, it is then necessary to unhook the nozzle 48 from the hook D' which will initiate a dispensing cycle of operation by first opening the valve D.

Opening of the valve D supplies air from the source of compressed air supply to the closed blow out valve J, the closed master valve E, the open charging valve H and the open four way valve F. The air is stopped at J and E, while it flows through the valve F, part of it charging the actuator H', thus closing the valve H and part of it flowing through the check valve 10 to charge the air chamber 68 and through the selector O to the actuator A' for opening the valve A and through the valves 176 and T to the sump 170. Since air to the valve H is restricted by the restricted opening at 65, insufficient air flows therefrom through the check valve 14 and to the actuators F' and C' to actuate them before the actuator H' has been fully actuated.

A quantity of oil 171 which has previously flowed by gravity from the storage tank S into the sump 170 and raised the float valve 198 to close communication between the storage tank and the sump, now being under pressure, will flow through the line 170a and through the valve A to the oil compartment B' in the cylinder B. This will force the piston 22 upwardly for charging the cylinder B with oil.

The air pressure on the oil will raise the piston 22 and compress the air in the compartment B'', but not to a pressure sufficient to force the piston 124 of Figure 5 in a left hand direction. This, of course, can be obtained by making the clearance between the piston 122 and the cylinder 123 great enough so that there is sufficient leakage to prevent building up pressure sufficient to overcome the tension of the spring 120. Also the piston 22 rises slowly so that such leakage can permit of its rise without high pressure being built up in the cylinder 123.

When the piston 22 strikes the rod 26 and raises it, the valve G will be closed and the master valve E will be opened so that the air from the valve E can flow into the air compartment B'' of the dispensing cylinder for tending to lower the piston 22 and discharge the oil therefrom, to the cylinder 132 for moving the pawl 140 of Figure 6 to the dotted line position.

The air from the valve E also passes through the check valve 12 to the actuators C', F', and J'. This opens the oil valve C (so that the oil will then flow to the dispensing nozzle 48) and opens the valve T so that the compressed air in the sump 170 will discharge into the tank S and then from the vent 203 to atmosphere.

Charging of the actuator F' changes the position of the control valve F so that the air supply from the cut-off valve D to the actuator H', the check valve 10, the selector valve O, the oil valve actuator A' and the sump valve T is cut off and communication is established with the atmosphere through the vent 57 so that the actuator H' returns to its initial position for recycling, the chamber 68 is left with a predetermined charge of air therein, the oil valve A is permitted to close and the air is released from behind the check valve 176.

The measured quantity of oil will be dispensed by the compressed air through the valves D and E forcing the piston 22 downwardly relative to the cylinder B. At the lower end of the stroke, the valve E will be closed for recycling and the valve G will be opened so that the compressed air in the compartment B'' (due to being at approximately the full pressure of the air supply) will be discharged from the compartment B'' through the valve G, through the valve seat 162 of Figure 7 to the piston 124 of Figure 5. Thus the air pressure consequently becomes sufficient within the cylinder 123 in spite of the leakage between the piston 122 and the cylinder to overcome the tension of the spring 120 so that the piston will be moved to its dotted line position for hooking the end 116 of the escapement lever under the second ratchet tooth ahead of the one held by the end 114 when in the full line position, and the exhaust ports 125 will pass the left end of the cylinder 123 so that the air behind the piston 124 will be discharged to atmosphere. This will soon reduce the pressure in the compartment B'' to a point where the spring 120 can return the escapement lever of Figure 5 to the full line position whereupon the tooth engaged by the hook 116 of the escapement lever will be released and the end 114 of the lever will swing into position to be engaged by the ratchet tooth 111 following the one engaging the end 114 on the drawings.

Release of the escapement hook 116 will permit the spring 146, of Figure 6, to rotate the drum 86 one-eighth revolution, its rotation being limited by the end 114 of the escapement lever.

As the escapement lever of Figure 5 permits a one-eighth return revolution of the ratchet drum 86, one of the cam teeth 90 will momentarily raise the projection 98 of the lever 96 for causing the lever 100 of Figure 4 to open the bleeder valve 108. The air from the valve actuators T', C', and F' will then flow through the valve 108 and the conduit 109 to the cylinder 105 for retaining the valve 108 open until most all of the air has thus flown through it. The air, of course, will flow out to atmosphere at 109a and when it is reduced to such an extent that its pressure can no longer overbalance the spring 108b of the valve 108 the valve will close.

The valve 108 bleeds enough air out of the bleeder line connected with the actuators T', C', and F' to allow these actuators to revert to their initial positions as shown in Figure 1, whereupon the cycle of operations will be automatically repeated because of the valve F permitting air from the supply valve D to flow partly to the actuator H' and partly to the check valve 10, piston 132 and selector O, etc. as already described at the beginning of the description of the operation of the device.

By using the piston 107 and the vent 109a, the valve 108 will remain open long enough to effectively permit bleeding of the actuators T', C', and F', even though the starting lever 104 is swung to its dotted line position of Figure 4 only momentarily by one of the cam lobes 90.

The dispensing operations will automatically continue for the number of quarts for which the dial 76 was set. Assuming it having been set for four quarts, four dispensing operations will automatically occur and the notch 153a of Figure 7 will allow the lever 154 to swing counterclockwise for changing the position of the valve from that shown in Figure 1 to that shown by full lines in Figure 7.

This will happen immediately following the fourth closing of the valve G so that when the piston 22 reaches its lower limit of movement and opens the valve G, the compressed air in the compartment B'' will flow through the valves G and 160 to the actuator M' and the compartment B' instead of to atmosphere through the valve 122. This will open the transfer valve M so that the predetermined charge of air in the air chamber 68 will flow to the actuator J'. Air in the actuator J' opens the blow out valve J so that some of the direct air pressure from the air supply cut-off valve D also flows into the compartment B' to supplement the air from the compartment B'' in the blow out operation.

The air from the compartment B' will blow out through the hose 44 and nozzle 48 until it has been reduced to atmosphere, while the length of time that direct air from the blow out valve J flows through the hose and nozzle will be determined by the size of the air chamber 68 and by the size of a vent 71 of the actuator J' which gradually releases the air in the actuator to atmosphere. When it is completely released, the blow out valve J being spring closed will close so that no more direct air pressure flows through the hose 44. Thus means is provided for augmenting the exhaust air from the compartment B'' of the cylinder B in the blow out operation.

Since it is difficult to entirely eliminate air leaks in the apparatus, the actuators F' and C' will automatically return to their initial positions of Figure 1 if the nozzle 48 is left hanging on the air cut-off hook D' long enough as this shuts off the air supply and such leakage would bleed the line connected with the valves 108 and the actuators T', C', and F''. If, when unhooking the nozzle, the operator finds that such automatic bleeding has not been completed, he merely depresses the starting knob 106 to thus complete it manually. The charging valve H insures that the bleeder line and consequently the actuators F'', C', and T' will remain fully charged with air while the nozzle 48 is off the hook even though there are air leaks.

The check valve 9 associated with the cylinder B prevents any possibility of oil backing up from the compartment B' through the valves 160, 122 and G or affecting the actuator M' during the filling operation of the dispensing cylinder.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:—

1. In a liquid dispensing apparatus, a storage tank, a dispensing mechanism, a dispensing nozzle and means for dispensing a predetermined number of quantities of liquid from said storage tank through said dispensing mechanism to said dispensing nozzle comprising an adjustable cam settable for the desired number of quantities, compressed air operated displacing means operable to cause one of such quantities to flow from said storage tank to said dispensing mechanism, another compressed air operated displacing means operable to force such quantity to said dispensing nozzle, means to cause repetition of said first and second compressed air operated displacing means for the number of times selected by the settable mechanism, said cam being returned to its initial position step by step by the successive operations of said second displacing means, a blow valve connected with said dispensing nozzle for admitting air thereto when the blow valve is open, said cam, when it reaches its initial position opening said blow valve to blow a quantity of air through said dispensing nozzle.

2. In a liquid dispensing apparatus, a storage tank, a dispensing cylinder having a piston therein, a conduit for admitting oil from said storage tank to one end of said cylinder, a conduit for discharging oil from said end of said cylinder, a first valve connected with the other end of said cylinder for exhausting air therefrom, a second valve connected with said other end of said cylinder for admitting compressed air thereto, means for operating said valves by said piston upon assuming its opposite limits of travel, means of connection between said first valve and said second mentioned conduit to conduct air exhausted from said cylinder to said second mentioned conduit after a predetermined number of exhausting operations performed by said first valve, said means of connection including a three-way valve and a discharge port to atmosphere, and means responsive to the reciprocations of said piston in said cylinder to operate said three-way valve to position during all but the last of the exhausting operations to permit exhaust through said port and during the last exhausting operation to position for exhausting the air into the second mentioned conduit.

3. Apparatus of the character described comprising a storage tank, a receptacle for receiving liquid from said storage tank, a dispensing nozzle for dispensing the received liquid from the receptacle and compressed air admission and exhaust valves for alternately admitting air to and exhausting air from said receptacle through a predetermined number of dispensing cycles, a settable control for said exhaust valve for causing it to be operable during all except the last dispensing cycle to discharge air to atmosphere, a blow-out valve for admitting air to said dispensing nozzle to clean the last dispensed oil therefrom, said blow-out valve being openable by exhaust air from said exhaust valve, said settable control causing said exhaust air to flow to said blow-out valve during said last dispensing cycle only.

4. In a liquid dispensing apparatus, a storage tank, a dispensing cylinder having a piston therein, a conduit for admitting oil from said storage tank to one end of said cylinder, a conduit for discharging oil from said end of said cylinder, a first valve connected with the other end of said cylinder for exhausting air therefrom, a second valve connected with said other end of said cylinder for admitting compressed air thereto, means for operating said valves by said piston upon assuming its opposite limits of travel, means of connection between said first valve and said second mentioned conduit to conduct air exhausted from said cylinder to said second mentioned conduit after a predetermined number of exhausting operations performed by said first valve, said means of connection including a three-way valve and a discharge port to atmosphere, means responsive to the reciprocations of said piston in said cylinder to operate said three-way valve to position during all but the last of the exhausting operations to permit exhaust through said port and during the last exhausting operation to position for exhausting the air into the second mentioned conduit, and a blow-out valve also connected with said second mentioned conduit to discharge air thereto, air operated means to operate said blow-out valve, said exhaust valve during the last exhausting operation discharging to said air operated means to open said blow-out valve.

5. In a liquid dispensing apparatus, a storage tank, a dispensing cylinder having a piston therein, a conduit for admitting oil from said storage tank to one end of said cylinder, a conduit for discharging oil from said end of said cylinder, a first valve connected with the other end of said cylinder for exhausting air therefrom, a second valve connected with said other end of said cylinder for admitting compressed air thereto, means for operating said valves by said piston upon assuming its opposite limits of travel, a third valve responsive to the reciprocations of said piston and operable after a predetermined number of exhausting operations performed by said first valve to discharge air into said second mentioned conduit, said third valve being in position during all but the last of the exhausting operations to permit exhaust of air from said cylinder to atmosphere and during the last exhausting operation in position to permit flow of air therethrough to said second mentioned conduit.

6. In a liquid dispensing apparatus, a plurality of storage tanks containing liquid under pressure, dispensing mechanism, a dispensing hose, a dispensing nozzle and means for dispensing a selected number of quantities of liquid selectively from any of said storage tanks through said dispensing mechanism and said dispensing hose to said dispensing nozzle comprising an exhaust valve connected with said dispensing mechanism to exhaust air therefrom to permit such flow from said storage tank into said dispensing mechanism and a valve connected with said dispensing mechanism and operable to admit compressed air thereto and thereby force such quantity through said dispensing hose to said dispensing nozzle, a blow-out valve having its outlet connected with said dispensing hose, an actuator for operating said blow-out valve, a selector settable for the number of quantities to be dispensed and responsive to the cycles of operation of the dispensing mechanism, said exhaust valve being connected with said actuator by said selector after said selected number of quantities have been dispensed and thereupon operable to open said blow-out valve for a time period to blow air into said dispensing hose after said number of quantities of oil have been dispensed therethrough.

7. In a liquid dispensing apparatus, a plurality of individual storage tanks, a metering receptacle having an element movable in accordance with the in-flow and out-flow of liquid relative to the receptacle, communicating means between each storage tank and said receptacle, a valve in each communicating means, a single dispensing nozzle communicating with said receptacle, said valves being selectively openable for dispensing a quantity of liquid selectively from any of said storage tanks through said receptacle to said dispensing nozzle, an exhaust valve connected with said receptacle and operable to cause exhaust of air therefrom and thereby cause said receptacle to receive such quantity from the selected storage tank, a second valve connected with said receptacle and operable by movement thereof to filled position to admit compressed air to said receptacle to thereby force said quantity to said dispensing nozzle and means selectively settable for causing a predetermined number of said dispensing operations to occur before said apparatus stops operating, said last means being responsive to the cycles of dispensing operations of said receptacle.

8. In a liquid dispensing apparatus, a plurality of individual storage tanks, a metering receptacle, communicating means between said storage tanks and said receptacle, a valve between each storage tank and said metering receptacle, said valves being selectively operable for dispensing a quantity of liquid selectively from any of said storage tanks through said receptacle to said dispensing nozzle, an exhaust valve operable to cause said receptacle to receive such quantity from the selected storage tank, a second valve operable upon the receptacle becoming filled to admit compressed air to said receptacle to thereby force such quantity to said dispensing nozzle, means selectively settable for causing a predetermined number of said dispensing operations to occur before said apparatus stops operating and a valve operable at the completion of dispensing such number of quantities to admit air to said nozzle to clean the last dispensed liquid from the inner walls thereof, said last valve being rendered operable by the conjoint action of said metering receptacle and selectively settable means.

9. In apparatus of the character described, a dispensing and measuring receptacle, a discharge line connected therewith, means for causing a selected number of cycles of liquid intaking and discharging thereby from any one of a plurality of storage tanks, comprising mechanism cyclically operable to alternately cause flow of liquid from one of said storage tanks to said receptacle and then to discharge the same from the receptacle, and means operated by said receptacle becoming empty after said number of quantities have been dispensed to clean the last dispensed, trapped liquid from the interior surface of the discharge line from said receptacle by blowing a charge of air therethrough.

10. Apparatus of the character described comprising a storage tank, a measuring receptacle connected therewith for receiving liquid therefrom, a dispensing nozzle for dispensing liquid from the receptacle, means for alternately exhausting actuating fluid from and admitting actuating fluid to said receptacle for receiving liquid into the receptacle and discharging it therefrom through a number of dispensing cycles, a clean-out means for the trapped liquid in the dispensing nozzle, means advanced step by step during each cycle until the last dispensing cycle causing operation of said clean-out means, and an indicating device chargeable with the used actuating fluid after each cycle and operable to indicating position only upon exhaustion of said actuating fluid from said indicating device.

11. In apparatus of the character described, a plurality of sources of liquid, each under pressure, a single dispenser hydraulically connected with all of said sources of liquid, a supply valve between each of said sources and said dispenser, a nozzle hydraulically connected with said dispenser, a dispensing valve controlling the flow of liquid from said dispenser to said nozzle, said dispenser being operable through a plurality of cycles each including flow of a measured quantity of liquid through one of said supply valves while said dispensing valve is closed, opening of said dispensing valve and forcing of said measured quantity of liquid from said dispenser through said nozzle, manual means for selecting the supply valve through which the liquid is to flow during said cycles, movable means which is manually movable to position for selecting the desirable number of cycles through which the apparatus is to operate, said movable means being connected with said dispenser and returned step by step thereby to initial position and when in initial position terminating said dispensing cycle, and means for manually starting said cycles.

12. In apparatus of the character described, a plurality of sources of liquid, each under pressure, a single dispenser hydraulically connected with all of said sources of liquid, a supply valve between each of said sources and said dispenser, a nozzle hydraulically connected with said dispenser, a dispensing valve controlling the flow of liquid from said dispenser to said nozzle, said dispenser being operable through a plurality of cycles each including flow of a measured quantity of liquid through one of said supply valves while said dispensing valve is closed, opening of said dispensing valve and forcing of said measured quantity of liquid from said dispenser through said nozzle, manual means for selecting the supply valve through which the liquid is to flow during said cycles, movable means which is manually movable to position for selecting the desirable number of cycles through which the apparatus is to operate, said movable means being connected with said dispenser and returned step by step thereby to initial position and when in initial position terminating said dispensing cycles, means for manually starting said cycles, and a valve opened by said means for selecting the number of cycles upon return thereof to its initial position for blowing air through said nozzle to clean out the last dispensed oil therefrom.

13. In a liquid dispensing apparatus, a plurality of storage tanks, a metering receptacle communicating with all of said storage tanks for dispensing successively quantities of liquid selectively from any of said storage tanks, a single dispensing nozzle communicating with said receptacle and mechanism manually operable for starting and thereafter automatically carrying on a desired number of cycles of operation of said apparatus for dispensing during each cycle, a quantity of liquid, said mechanism including means to cause, during each cycle, a quantity of liquid to flow from the selected storage tank to said receptacle, means to stop the flow of liquid from said storage tank to said receptacle and means to then force such quantity of liquid from said receptacle, said mechanism manually operable comprising a movable device for terminating operation of said cycles when in its initial position and operated by said metering receptacle step by step to return to initial position after being moved manually therefrom to set it for the desired number of cycles.

14. In a liquid dispensing apparatus, a plurality of storage tanks, a metering receptacle communicating with all of said storage tanks for dispensing successively quantities of liquid selectively from any of said storage tanks, a single dispensing nozzle communicating with said receptacle and mechanism manually operable for starting and thereafter automatically carrying on a desired number of cycles of operation of said apparatus for dispensing during each cycle, a quantity of liquid, said mechanism including, first, means to cause during each cycle a quantity of liquid to flow from the selected storage tank to said receptacle; second, means to stop the flow of liquid from said storage tank to said receptacle; third, means to then force such quantity of liquid from said receptacle; and fourth, means to clean out the film of last dispensed liquid from the inner walls of the dispensing nozzle after the last dispensing cycle of the selected number of cycles has been completed comprising a valve to admit air thereto, said mechanism manually operable comprising a movable device for terminating operation of said cycles when in its initial position and operated by said metering receptacle step by step to return to initial position after being moved manually therefrom to set it for the desired number of cycles and opening said valve when in said initial position.

15. In a liquid dispensing apparatus, a dispensing cylinder, a dispensing piston reciprocable therein, a liquid supply receptacle hydraulically connected with one end of said cylinder, a dispensing nozzle hydraulically connected with said end of said cylinder, a liquid dispensing valve between said cylinder and said nozzle, a master valve for supplying actuating fluid to the other end of said cylinder, an exhaust valve for exhausting actuating fluid therefrom, actuating means for all three of said valves operable by said piston at the ends of its stroke, said master valve and liquid dispensing valve upon being opened by said piston at the filled end of its stroke, supplying actuating fluid to said cylinder and permitting flow of said liquid through said dispensing nozzle respectively, a clean-out valve for admitting, when open, clean-out air to said dispensing nozzle, a control valve for actuating fluid exhausted from said exhaust valve settable for a predetermined number of quantities of liquid to be dispensed and operating at the completion of such number of quantities opening said clean out valve.

16. The combination with a liquid dispenser having a dispensing nozzle and a dispensing mechanism adapted to have an actuating fluid alternately discharged from and admitted thereto, a controlling mechanism operable to blow out the remaining liquid in the dispensing nozzle after a predetermined number of dispensing operations, comprising a manually settable member, an actuator therefor, a control valve operated by said member, said control valve being connected with said dispensing mechanism to cause actuating fluid therefrom to exhaust to atmosphere, said actuator being connected with said dispensing mechanism to actuate said member during each dispensing cycle, said member, after the last of said predetermined number of cycles, positioning said control valve to exhaust air through said dispensing nozzle to atmosphere.

17. The combination with a liquid dispenser having a dispensing nozzle and a dispensing mechanism adapted to have an actuating fluid alternately discharged from and admitted thereto, a controlling mechanism operable to blow out the remaining liquid in the dispensing nozzle after a predetermined number of dispensing operations, comprising a manually settable member, ratchet teeth thereon, an actuating pawl for said member and engageable with said teeth, a control valve operated by said member, said control valve being connected with said dispensing mechanism to cause actuating fluid therefrom to exhaust to atmosphere, said actuating pawl being connected with said dispensing mechanism and actuated thereby to actuate said member during each dispensing cycle, said member, after the last of said predetermined number of cycles, positioning said control valve to exhaust air through said dispensing nozzle to atmosphere.

18. The combination with a liquid dispenser having a dispensing nozzle and a dispensing mechanism adapted to have an actuating fluid alternately discharged from and admitted thereto, a controlling mechanism operable to blow out the remaining liquid in the dispensing nozzle after a predetermined number of dispensing operations, comprising a manually settable member, an actuator therefor, a control valve operated by said member, said control valve being connected with said dispensing mechanism to cause actuating fluid therefrom to exhaust to atmosphere, said actuator being connected with said dispensing mechanism to actuate said member during each dispensing cycle, said member, after the last of said predetermined number of cycles, positioning said control valve to exhaust air from said dispensing mechanism through said dispensing nozzle and a blow out valve for supplementing such air, said blow out valve being operable by actuating fluid, said control valve after the last of said predetermined number of cycles supplying actuating fluid thereto for a time period.

CHARLES W. GINTER.
JOHN F. CARTER.